(12) United States Patent
Hsueh et al.

(10) Patent No.: US 11,874,588 B2
(45) Date of Patent: Jan. 16, 2024

(54) PROJECTION DEVICE HAVING HEAT DISSIPATION STRUCTURES

(71) Applicant: Coretronic Corporation, Hsin-Chu (TW)

(72) Inventors: Hwai-Ning Hsueh, Hsin-Chu (TW); Wei-Min Chien, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/476,480

(22) Filed: Sep. 16, 2021

(65) Prior Publication Data

US 2022/0100064 A1   Mar. 31, 2022

(30) Foreign Application Priority Data

Sep. 29, 2020   (CN) .......................... 202022180279.X

(51) Int. Cl.
  *G03B 21/16*   (2006.01)
  *H04N 9/31*   (2006.01)

(52) U.S. Cl.
  CPC ........... *G03B 21/16* (2013.01); *H04N 9/3144* (2013.01)

(58) Field of Classification Search
  CPC .............................. G03B 21/16; H04N 9/3144
  See application file for complete search history.

(56) References Cited

U.S. PATENT DOCUMENTS

| | | | | |
|---|---|---|---|---|
| 6,072,459 A * | 6/2000 | Asakawa | ............... | G03B 21/16 349/161 |
| 7,384,152 B2 * | 6/2008 | Takeuchi | ............. | H04N 9/3141 353/121 |
| 7,578,595 B2 * | 8/2009 | Miwa | ................... | H04N 9/3141 362/264 |
| 7,703,927 B2 * | 4/2010 | Utsunomiya | ..... | G02F 1/133385 349/161 |
| 7,967,446 B2 * | 6/2011 | Utsunomiya | ..... | G02F 1/133385 349/161 |
| 8,128,236 B2 * | 3/2012 | Kim | ....................... | G03B 21/16 353/54 |
| 8,240,856 B2 * | 8/2012 | Yang | ................... | H04N 9/3141 353/57 |

(Continued)

FOREIGN PATENT DOCUMENTS

TW   I295405   4/2008

OTHER PUBLICATIONS

DLP5500 (Year: 2019).*
DLP6500FYE (Year: 2014).*
DLP660TE (Year: 2019).*

*Primary Examiner* — Bao-Luan Q Le
(74) *Attorney, Agent, or Firm* — JCIPRNET

(57) ABSTRACT

A projector includes at least one light source module, at least one light valve module, a projection lens, and at least one heat dissipation structure. The at least one light source module is configured to provide an illumination beam. The at least one light valve module is disposed on a transmission path of the illumination beam and is configured to convert the illumination beam into an image beam. The projection lens is disposed on a transmission path of the image beam and is configured to project the image beam. The at least one heat dissipation structure is connected to the at least one light valve module.

9 Claims, 5 Drawing Sheets

(56) References Cited

U.S. PATENT DOCUMENTS

| | | | | |
|---|---|---|---|---|
| 8,256,901 B2* | 9/2012 | Lim | ............... | H05K 7/20972 |
| | | | | 353/57 |
| 2005/0117077 A1* | 6/2005 | Utsunomiya | .......... | G03B 21/16 |
| | | | | 349/5 |
| 2005/0236144 A1* | 10/2005 | Takeuchi | ............... | F28D 15/00 |
| | | | | 348/E5.143 |
| 2006/0082732 A1* | 4/2006 | Miwa | ................... | H04N 9/3141 |
| | | | | 353/57 |
| 2006/0290893 A1* | 12/2006 | Lim | ...................... | G03B 21/16 |
| | | | | 353/57 |
| 2007/0024814 A1* | 2/2007 | Woo | ...................... | G03B 21/16 |
| | | | | 353/57 |
| 2007/0070629 A1* | 3/2007 | Hulick | ................... | F21V 29/80 |
| | | | | 362/345 |
| 2009/0290131 A1* | 11/2009 | Kim | ...................... | G03B 21/16 |
| | | | | 353/15 |
| 2010/0053566 A1* | 3/2010 | Yang | ................... | H04N 9/3141 |
| | | | | 353/58 |
| 2010/0157176 A1* | 6/2010 | Utsunomiya | ........ | H04N 9/3144 |
| | | | | 349/5 |
| 2014/0300872 A1* | 10/2014 | Kim | ..................... | H04N 9/3144 |
| | | | | 353/58 |
| 2019/0041731 A1* | 2/2019 | Katayama | ............ | H04N 9/3144 |
| 2020/0241401 A1* | 7/2020 | Sano | ....................... | F04D 13/12 |

* cited by examiner

PROJECTION DEVICE HAVING HEAT DISSIPATION STRUCTURES

CROSS-REFERENCE TO RELATED APPLICATION

This application claims the priority benefit of China application serial no. 202022180279.X, filed on Sep. 29, 2020. The entirety of the above-mentioned patent application is hereby incorporated by reference herein and made a part of this specification.

BACKGROUND

Technical Field

The disclosure relates to a display device, and particularly to a projector with a heat dissipation structure.

Description of Related Art

A projector is a display device for generating a picture anytime and anywhere. An imaging principle of the projector is converting an illumination beam generated by a light source module into an image beam through a light valve, and then projecting the image beam onto a screen or a wall surface through a lens to form a projection image. In addition, since the light valve of the projector generates heat during an operation, it is necessary to dispose a heat dissipation structure in the projector to dissipate the heat of the light valve. The heat dissipation structure usually dissipates the heat for a single heat generating module, and the heat generating modules with different temperature specifications do not share the heat dissipation structure.

In the current projectors, some light valves have good imaging quality only in a specific temperature range. Due to a correlation between the light valve and the imaging quality, an operating temperature range of the projector is limited. For example, the projector may have poor image quality due to the low temperature of the light valve when the projector is used during an initial startup period and in a low temperature environment. Therefore, how to realize optimal thermal management inside the projector is one of the difficult issues faced by relevant manufacturers during design and development.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a projector, having good imaging quality.

Other objectives and advantages of the disclosure may be further understood from the technical features disclosed herein.

An embodiment of the disclosure provides a projector including at least one light source module, at least one light valve module, a projection lens, and at least one heat dissipation structure. The at least one light source module is configured to provide an illumination beam. The at least one light valve module is disposed on a transmission path of the illumination beam and is configured to convert the illumination beam into an image beam. The projection lens is disposed on a transmission path of the image beam and is configured to project the image beam. The at least one heat dissipation structure is connected to the at least one light valve module.

Based on the above, the embodiments of the disclosure have at least one of the following advantages or effects. In the projector of the disclosure, the light valve module and the light source module or the electronic module share the heat dissipation structure, which reduces the number of the heat dissipation structures which are used. Furthermore, the heat dissipation structure transfers the heat energy of the light source module or the electronic module with the higher operating temperature to the light valve module. Therefore, under the condition that the light valve module has good imaging quality only in the specific target temperature range, the temperature of the light valve module can easily reach the target temperature range to achieve good imaging quality. In addition, since the light valve module shares the heat dissipation structure with the light source module or the electronic module, the heat dissipation structure has a larger volume than an independent heat dissipation structure and has the better heat dissipation efficiency, which improves the temperature reduction efficiency of the light source module or the electronic module.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

The above and other technical contents, features and effects of the disclosure are apparent from the following detailed description of an exemplary embodiment with reference to the accompanying drawings. Directional wordings mentioned in the following embodiments, such as "up," "down," "left," "right," "front," and "back," merely refer to directions in the accompanying drawings. Therefore, the directional wordings are provided to illustrate rather than limit the disclosure.

Figure 1:
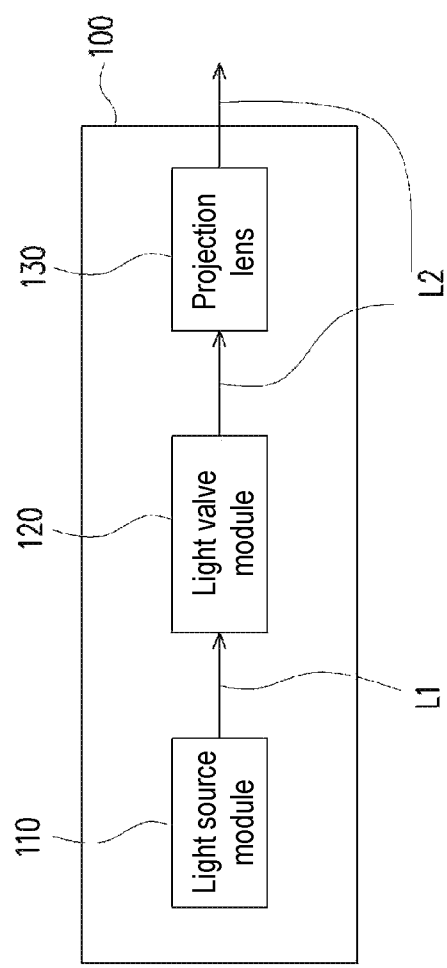
FIG. 1 is a block diagram of the projector according to an embodiment of the disclosure.
Figure 2:
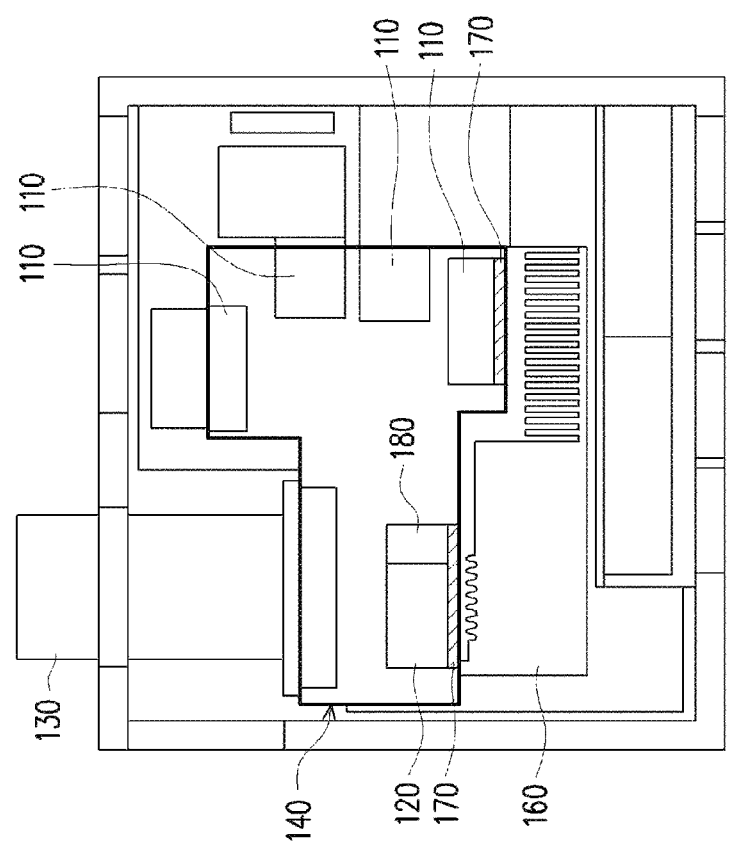
FIG. 2 is a schematic diagram of the projector of FIG. 1.

FIG. 1 is a schematic diagram of the structure of the projector according to an embodiment of the disclosure. FIG. 2 is a schematic diagram of the projector of FIG. 1. Referring to FIGS. 1 and 2, a projector 100 of this embodiment includes a light source module 110, a light valve module 120 and a projection lens 130. The light source module 110 is configured to provide an illumination beam L1. In this embodiment, the light source module 110 includes a plurality of light-emitting elements, which are composed of one or more light-emitting diodes (LEDs), but the disclosure is not limited thereto.

The light valve module 120 is disposed on a transmission path of the illumination beam L1 and is configured to convert the illumination beam L1 into an image beam L2. For example, in this embodiment, the light valve module 120 is a Liquid Crystal on Silicon panel (LCoS panel). When the LCoS panel converts the illumination beam L1 into the image beam L2, the conversion efficiency and the imaging quality of the LCoS panel are related to the temperature, which means that the LCoS panel has a specific applicable temperature range. In other embodiments, the light valve module 120 may be a Liquid Crystal Display (LCD). However, the disclosure does not limit the form and the type of the light valve module 120.

The projection lens 130 is disposed on a transmission path of the image beam L2 and is configured to project the image beam L2 onto a screen or a wall surface (not shown in figures). For example, the projection lens 130 includes a combination of one or a plurality of optical lenses having a diopter, and includes for example various combinations of non-planar lenses including biconcave lenses, biconvex lenses, concave-convex lenses, convex-concave lenses, plane-convex lenses, plane-concave lenses, etc. In one embodiment, the projection lens 130 may include planar optical lenses to project the image beam L2 from the light valve module 120 to a projection target in a reflective or penetrating manner. The disclosure does not limit the form and the type of the projection lens 130.

Referring to FIG. 2, in this embodiment, the projector 100 includes an optical engine 140 and a heat dissipation structure 160. The plurality of light source modules 110 and the light valve module 120 are disposed in the optical engine 140, and the heat dissipation structure 160 is located outside the optical engine 140 and connected to the corresponding light source module 110 and the light valve module 120. In another embodiment, the heat dissipation structure 160 connected to the light valve module 120 is connected to either the plurality of light source modules 110 or electronic modules that have a higher operating temperature. The electronic module is located outside the optical engine 140 and may be a light source driving circuit, a light valve driving circuit, or a signal processing circuit. Note that in the general projectors, the light valve modules and the light source modules with different temperature specifications are respectively connected to heat dissipation structures, but the light source modules 110 and the light valve module 120 in this embodiment share the heat dissipation structure 160. Therefore, the number of the heat dissipation structures 160 which are used is reduced. In this embodiment, the heat dissipation structure 160 is "connected" to the light valve module 120 and the light source module 110, which may be but not necessarily disposed on opposite sides of the optical engine 140, so as to transmit the heat energy between the light source module 110/the light valve module 120 and the heat dissipation structure 160 through the optical engine 140.

In addition, since the light valve module 120 and the light source module 110 share the heat dissipation structure 160, the heat dissipation structure 160 is able to transfer the heat energy of the light source module 110 to the light valve module 120. Therefore, under the condition that the light valve module 120 has good imaging quality only in the specific target temperature range, the temperature of the light valve module 120 can easily reach the target temperature range to achieve good imaging quality. For example, if the light valve module 120 does not receive the heat from the light source module 110 through the heat dissipation structure 160, the temperature of the light valve module 120 may be less likely to reach the target temperature range when the ambient temperature is lower than a temperature value (such as 25 degrees Celsius). As in this embodiment, the light valve module 120 receives the heat from the light source module 110 through the heat dissipation structure 160, so the temperature of the light valve module 120 can still reach the target temperature range when the ambient temperature is lower than the temperature value (such as 25 degrees Celsius). In one embodiment, the light valve module 120 is a LCoS panel and has a light-receiving surface and a heat-dissipating surface. The heat-dissipating surface of the light valve module 120 is attached to the optical engine 140, and the heat dissipation structure 160 is correspondingly disposed in the attachment area of the heat-dissipating surface of the light valve module 120 corresponding to the optical engine 140. In this way, the heat absorption or heat dissipation efficiency of the light valve module 120 through the heat dissipation structure 160 is improved, and the operating temperature of the light valve module 120 is stabilized to improve the stability of the image beam L2.

Furthermore, in FIG. 2, the heat dissipation structure 160 corresponding to configuration structures of the light valve module 120 and the light source module 110 may be designed differently according to different requirements of heat dissipation, so that the heat dissipation efficiency of the same heat dissipation structure 160 for the light source module 110 is greater than the heat dissipation efficiency of the same heat dissipation structure 160 for the light valve module 120. In this embodiment, since the light valve module 120 and the light source module 110 share the heat dissipation structure 160, the heat dissipation structure 160 has a larger volume than an independent heat dissipation structure and has better heat dissipation efficiency, which improves the temperature reduction efficiency of the light source module 110.

The heat dissipation structure 160 of this embodiment includes at least one of a heat pipe, a heat dissipation fin group, and a heat dissipation block. However, the disclosure does not limit the number, structural form and the type of the heat dissipation structure 160. In different embodiments, the configuration and position of the heat dissipation structure 160 may be further adjusted according to the requirements.

In this embodiment, the projector 100 further includes a thermal interface material 170. The heat dissipation structure 160 is connected to the corresponding light source module 110 and the light valve module 120 through the thermal interface material 170. The thermal interface material 170 is, for example, a thermal pad, a thermal conductive adhesive, a thermal gel, etc. The disclosure does not limit the material and the type of the thermal interface material 170. In different embodiments, the thermal interface material 170 may be omitted. In another embodiment, the optical engine 140 has an opening (not shown in the figures). The heat dissipation structure 160 is at least partially disposed outside the optical engine 140 through the opening, and the thermal interface material 170 is disposed on the heat-dissipating surfaces of the light valve module 120 and the light source module 110 to allow the heat-dissipating surfaces of the light valve module 120 and the light source module 110 to be attached to the heat dissipation structure 160 through the opening.

The projector 100 of this embodiment further includes an auxiliary heater 180. When the ambient temperature is so low that the heat of the light source module 110 is not enough to heat the light valve module 120, the auxiliary heater 180 starts and heats the light valve module 120 so that the temperature of the light valve module 120 is within the target temperature range to achieve good imaging quality.

Figure 3:
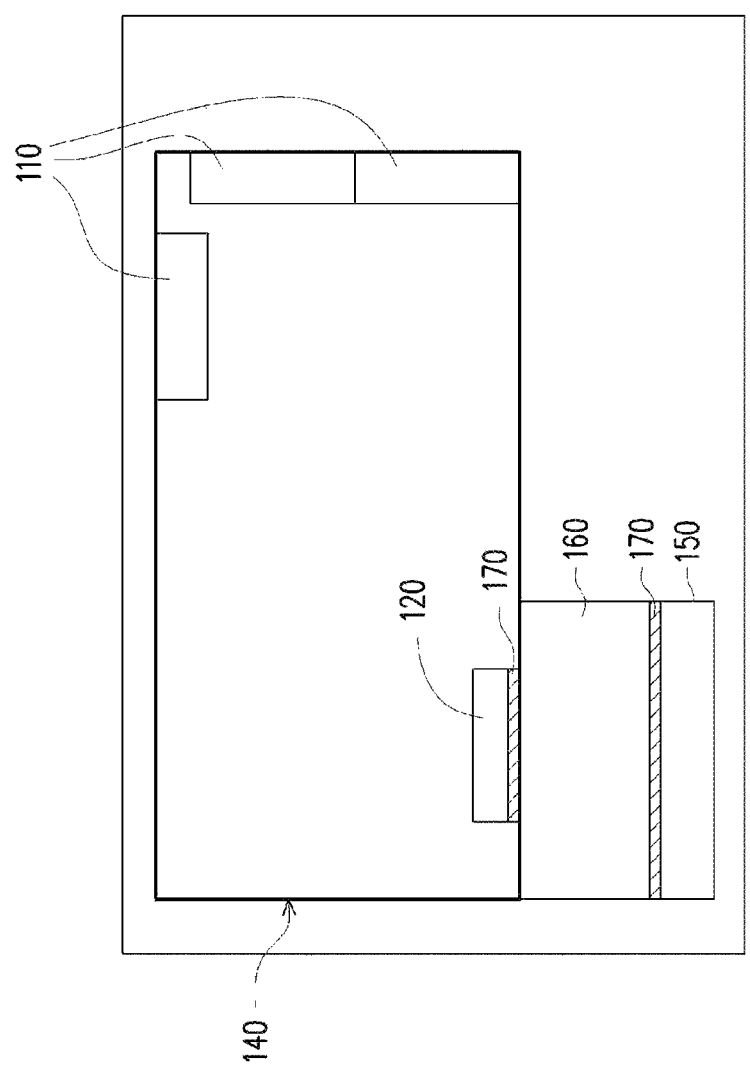
FIG. 3 is a schematic diagram of the projector according to another embodiment of the disclosure.

FIG. 3 is a schematic diagram of the projector according to another embodiment of disclosure. In the projector 100A of FIG. 3, the light source module 110, the light valve module 120, the optical engine 140, the heat dissipation structure 160, and the thermal interface material 170 are similar to those in the previous embodiment, and are not repeated here. The difference between the embodiment shown in FIG. 3 and the previous embodiment is that the projector 100A includes an electronic module 150. The electronic module 150 is, for example, a light source driving circuit coupled to the light source module 110. The heat dissipation structure 160 is connected to the light valve module 120 and the electronic module 150. That is, the heat dissipation structure 160 of this embodiment is shared by the light valve module 120 and the electronic module 150, unlike the heat dissipation structure 160 of the embodiment shown in FIG. 2 that is shared by the light valve module 120 and the light source module 110. An inductance and an integrated circuit (IC) in the light source driving circuit (the electronic module 150) have the higher operating temperature. The heat dissipation structure 160 may transfer the heat energy of the light source driving circuit (the electronic module 150) to the light valve module 120, so that the temperature of the light valve module 120 can reach the target temperature range easily to achieve good imaging quality. In other embodiments, the electronic module 150 may be a light valve driving module or a signal processing module. The disclosure is not limited thereto.

Figure 4:
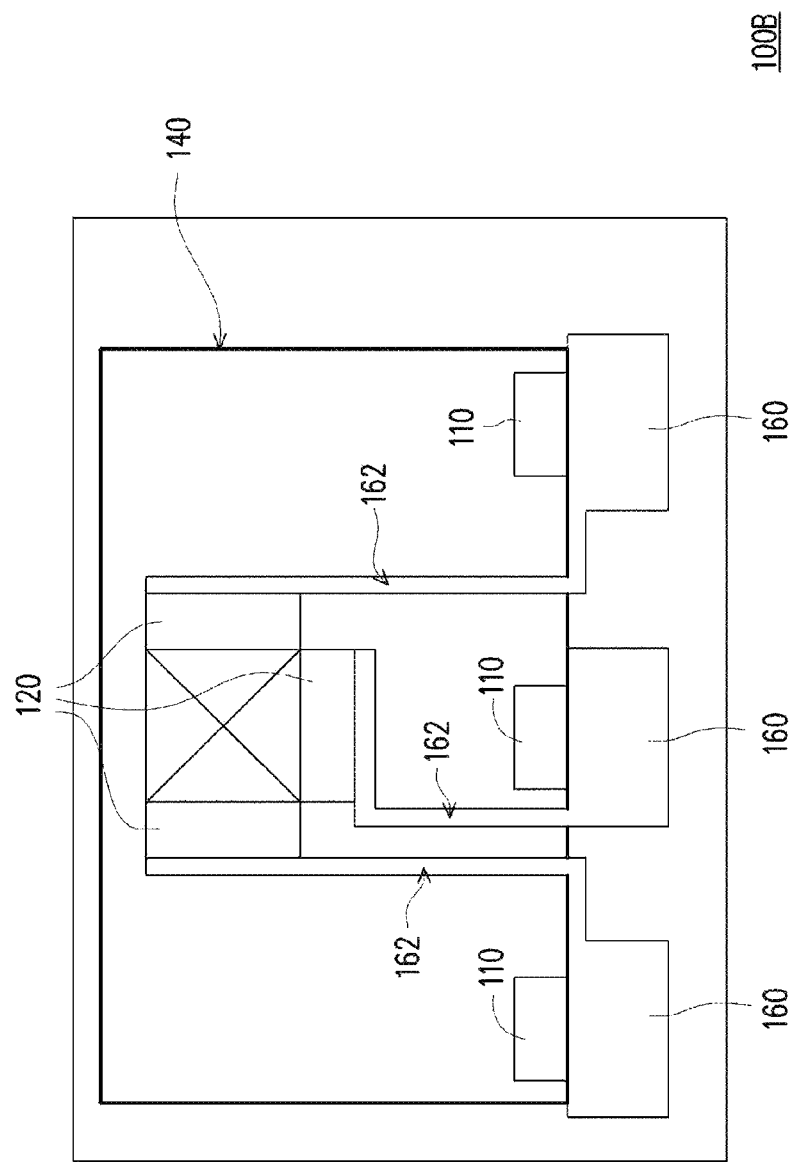
FIG. 4 is a schematic diagram of the projector according to another embodiment of the disclosure.

FIG. 4 is a schematic diagram of the projector according to another embodiment of the disclosure. The difference between the projector 100B of FIG. 4 and the projector 100 of FIG. 1 is that the projector 100B is provided with more than one light valve module 120 and more than one heat dissipation structure 160. These heat dissipation structures 160 are partially located outside the optical engine 140 and are not connected to one another, and the heat dissipation structures 160 are respectively connected to the plurality of light source modules 110. Each of the heat dissipation structures 160 has an extension portion 162. Each of the extension portions 162 extends into the optical engine 140 and is connected to one corresponding light valve module 120. That is, in the projector 100B, each of the light valve modules 120 is independently connected to the corresponding light source module 110 through the corresponding heat dissipation structure 160. In this way, different light valve modules 120 may be respectively connected to the light source modules 110 with different operating temperatures according to the heating requirements of the different light valve modules 120 to independently and appropriately control the temperature of each of the light valve modules 120. Specifically, the operating temperature of one of the light valve modules 120 is higher than the operating temperature of another light valve module 120, and accordingly, the heat dissipation structure 160 connected to the light valve module 120 with the higher operating temperature is connected to the light source module 110 with the higher operating temperature. In other embodiments, the light valve module 120 of FIG. 4 may be connected to other types of electronic modules 150 with the higher operating temperature through the heat dissipation structure 160 instead. The disclosure is not limited thereto. In another embodiment, the plurality of light source modules 110 respectively emit blue light, green light and red light. The auxiliary heater 180 is disposed in the light valve module 120 which shares the heat dissipation structure 160 with the light source module 110 that emits blue light or/and the light valve module 120 which shares the heat dissipation structure 160 with the light source module 110 that emits red light. In short, if the heat energy generated by the light source module 110 is lower, the auxiliary heater 180 may be disposed according to the designer's needs to enable each of the light valve modules 120 to operate at the similar temperature.

Figure 5:
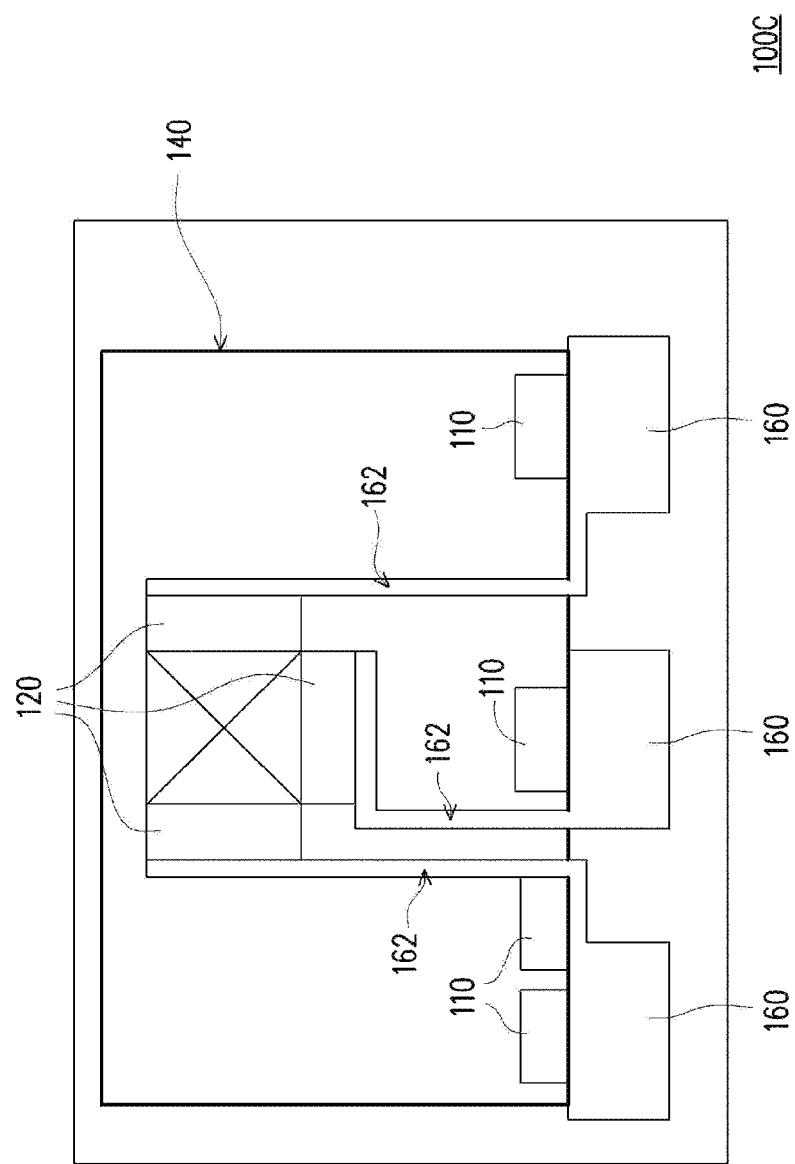
FIG. 5 is a schematic diagram of the projector according to another embodiment of the disclosure.

FIG. 5 is a schematic diagram of the projector according to another embodiment of the disclosure. The difference between the projector 100C of FIG. 5 and the projector 100B of FIG. 4 is that one of the light valve modules 120 is connected to a plurality of light source modules 110 (two are shown in FIG. 5) through the corresponding heat dissipation structures 160. In other embodiments, each of the light valve modules 120 may be connected to a larger number of light source modules 110 and/or electronic modules through the corresponding heat dissipation structures 160. The disclosure is not limited thereto.

In summary, the embodiments of the disclosure have at least one of the following advantages or effects. In the projector of the disclosure, the light valve module and the light source module or the electronic module share the heat dissipation structure, which reduces the number of the heat dissipation structures which are used. Furthermore, the heat dissipation structure transfers the heat energy of the light source module or the electronic module with the higher operating temperature to the light valve module. Therefore, under the condition that the light valve module has good imaging quality only in the specific target temperature range, the temperature of the light valve module can easily reach the target temperature range to achieve good imaging quality. In addition, since the light valve module shares the heat dissipation structure with the light source module or the electronic module, the heat dissipation structure has a larger volume than an independent heat dissipation structure and has the better heat dissipation efficiency, which improves the temperature reduction efficiency of the light source module or the electronic module.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projector, comprising at least one light source module, at least one light valve module, a projection lens, at least one electronic module, and at least one heat dissipation structure, wherein:

the at least one light source module is configured to provide an illumination beam;

the at least one light valve module is disposed on a transmission path of the illumination beam and is configured to convert the illumination beam into an image beam;

the projection lens is disposed on a transmission path of the image beam and is configured to project the image beam;

the at least one electronic module is coupled to at least one of the at least one light source module and the at least one light valve module; and the at least one heat dissipation structure is connected to at least one of the at least one light valve module and the at least one electronic module, wherein a number of the at least one heat dissipation structure and a number of the at least one light valve module are both plural, when the projector is in operating status, each of the plural heat dissipation structures is individual and separates from one another, and each of the plural light valve modules is independently connected to at least one of the at least one light source module and the at least one electronic module through the corresponding one of the plural heat dissipation structures, wherein an operating temperature of each of the plural light valve modules is lower than an operating temperature of the at least one light source module connected to the correspond one of the plural heat dissipation structures or/and an operating temperature of the at least one electronic module connected to the corresponding one of the plural heat dissipation structures.

2. The projector as recited in claim 1, wherein one of the plural heat dissipation structures connected to the corresponding one of the light valve modules is connected to one of the at least one light source module and the at least one electronic module, which has a higher operating temperature than the other.

3. The projector as recited in claim 1, wherein the at least one electronic module is a light source driving circuit, a light valve driving circuit, or a signal processing circuit.

4. The projector as recited in claim 1, wherein one of the plural light valve modules is connected to a plurality of the at least one light source module and the at least one electronic module through the corresponding one of the plural heat dissipation structures.

5. The projector as recited in claim 1, wherein one of the plural heat dissipation structures comprises at least one of a heat pipe, a heat dissipation fin group, and a heat dissipation block.

6. The projector as recited in claim 1, further comprising an optical engine, wherein the at least one light source module and the plural light valve modules are disposed in the optical engine, and each of the plural heat dissipation structures is at least partially located outside the optical engine.

7. The projector as recited in claim 6, comprising at least one thermal interface material, wherein one of the plural heat dissipation structures is connected to the corresponding at least one light source module, the corresponding at least one electronic module, or the corresponding one of the plural light valve modules through the at least one thermal interface material.

8. The projector as recited in claim 6, wherein one of the plural heat dissipation structures has an extension portion, and the extension portion extends into the optical engine to connect to the corresponding one of the plural light valve modules.

9. The projector as recited in claim 1, comprising at least one auxiliary heater, wherein the at least one auxiliary heater is configured to heat one of the plural light valve modules.

\* \* \* \* \*